United States Patent [19]

Damikolas

[11] 4,371,942
[45] Feb. 1, 1983

[54] METHOD AND APPARATUS FOR CONTROLLING AN AUTOMATIC SET-UP CYCLE OF OPERATION

[75] Inventor: Gerasimos Damikolas, West Chester, Ohio

[73] Assignee: Cincinnati, Milacron Inc., Cincinnati, Ohio

[21] Appl. No.: 245,045

[22] Filed: Mar. 18, 1981

[51] Int. Cl.³ .............................................. G06F 15/46
[52] U.S. Cl. .................................. 364/475; 51/165.71; 318/569; 364/170
[58] Field of Search ................ 364/474, 475, 167–171; 51/165.71, 165.74–165.77, 165.83, 165.87, 165.91; 408/8, 10, 11, 12, 13; 82/2 B, 2.5, 21 R, 21 B; 318/569, 570, 572

[56] References Cited

U.S. PATENT DOCUMENTS

| | | | |
|---|---|---|---|
| 3,605,909 | 9/1971 | Lemelson | 408/8 |
| 3,628,002 | 12/1971 | Meese et al. | 318/572 X |
| 3,641,849 | 2/1972 | Kinney | 318/572 X |
| 3,699,720 | 10/1972 | Lenning | 51/165.77 |
| 3,727,493 | 4/1973 | Lahm | 318/572 X |
| 3,963,364 | 6/1976 | Lemelson | 408/8 |
| 4,007,411 | 2/1977 | Saito | 318/572 X |
| 4,074,467 | 2/1978 | Robillard | 51/165.92 |

Primary Examiner—Joseph F. Ruggiero
Attorney, Agent, or Firm—John W. Gregg

[57] ABSTRACT

A method and apparatus for executing a set-up cycle of operation to automatically move a cutting tool and workpiece into close proximity from an unknown positional relationship. After selecting the set-up mode of operation, the cutting tool and workpiece are moved together; and upon detecting superficial contact, the cutting tool and workpiece are separated by a selectable distance. The cycle of operation may also be used to establish the absolute position of the working edge of the cutting tool from which subsequent cutting tool motion may be measured.

11 Claims, 3 Drawing Figures

METHOD AND APPARATUS FOR CONTROLLING AN AUTOMATIC SET-UP CYCLE OF OPERATION

BACKGROUND OF THE INVENTION

The invention relates generally to the area of machine controls and specifically provides a method and apparatus for automatically locating a cutting tool in close proximity to a workpiece.

Historically, machine control development has been primarily oriented to automating and improving the quality of the machining operation, i.e. those machine operations by which a cutting tool is required to produce a finished part within a specified period of time. However, various surveys indicate that in many manufacturing facilities, production machining operations are being performed on the workpiece approximately only 30% of the time that the machine is manned. Consequently, during most of the time, a machine is idle and is not being used to perform useful work. A significant portion of this time is consumed by set-up procedures which are required to establish particular machine parameters associated with a particular part.

Many set-up procedures require that the cutting tool be placed in close proximity with the workpiece. For example, some set-up procedures require that the cutting tool be moved while it is immediately adjacent to the workpiece. Other set-up procedures require that the cutting tool be located close to the workpiece to check alignments, squareness, taper, etc. Further set-up procedures may require that superficial contact between the cutting tool and the workpiece be used to identify the location of the working edge of the cutting tool from which other cutting tool positions may be measured. This is particularly important on a grinding machine because the location of the working edge is not easily predetermined and is constantly changing.

With traditional machine control systems, and in particular grinding machine controls, the set-up mode is a purely manual operation. All cutting tool motion is under the manual control of the operator, and these controls provide either selectable fixed incremental displacements or continuous motion at selectable feedrates. In either case, the process of bringing a cutting tool into close proximity with the workpiece is a delicate, skillful and time consuming set-up operation. Further, the operator must physically be close to the interface between the cutting tool and the workpiece in order to visually detect the superficial contact.

Consider, for example, a grinding machine having the large mass of a grinding wheel rotating at a high angular velocity with coolant flooding the cutting surface. In order to bring the wheel into superficial contact with the workpiece, the operator is provided with selectable feedrates for controlling the motion of the grinding wheel. The length of the traverse required by the cutting tool may be several inches. The faster feed rates tend to provide a rapid motion that is difficult to judge as the cutting tool approaches the workpiece. The slower feedrates are typically very slow and require excessive periods of time to move the cutting tool short distances. Further, as the wheel nears the workpiece, the flood of coolant hides the area of interface between the cutting tool and the workpiece thereby inhibiting the operator's capability of detecting the superficial contact. Consequently, the seemingly simple task of bringing a grinding wheel into close proximity with the workpiece is a time consuming operation that requires significant skill and care.

Therefore, an object of the invention is to provide an automatic set-up cycle of operation for quickly moving a cutting tool into close proximity with the workpiece without requiring a high level of operator skill.

Another object of the invention is to quickly and easily locate the cutting tool and the workpiece in a predetermined positional relationship during the set-up mode from which a subsequent machining cycle of operation may begin.

A further object of the invention is to automatically align the working edge of the cutting tool relative to the workpiece.

A still further object of the invention is to automatically establish a reference with respect to the working edge of the cutting tool so that subsequent tool motion may be measured with respect to the cutting edge.

SUMMARY OF THE INVENTION

According to one embodiment of the invention a control apparatus is connected to a machine having a base supporting a workpiece, a cutting tool, a sliding member and a slide drive connected to the control for producing relative motion between the cutting tool and the workpiece to automatically execute a set-up cycle of operation. The control includes means for setting a final position signal representing a predetermined positional relationship between the cutting tool and the workpiece. Further means are provided for initiating a set-up cycle of operation which causes motion of the cutting tool toward the workpiece. Means are provided for detecting contact between the cutting tool and the workpiece; and in response to said contact, the cutting tool is moved away from the workpiece to the position defined by the final position signal.

DESCRIPTION OF THE PREFERRED EMBODIMENT

Figure 1:
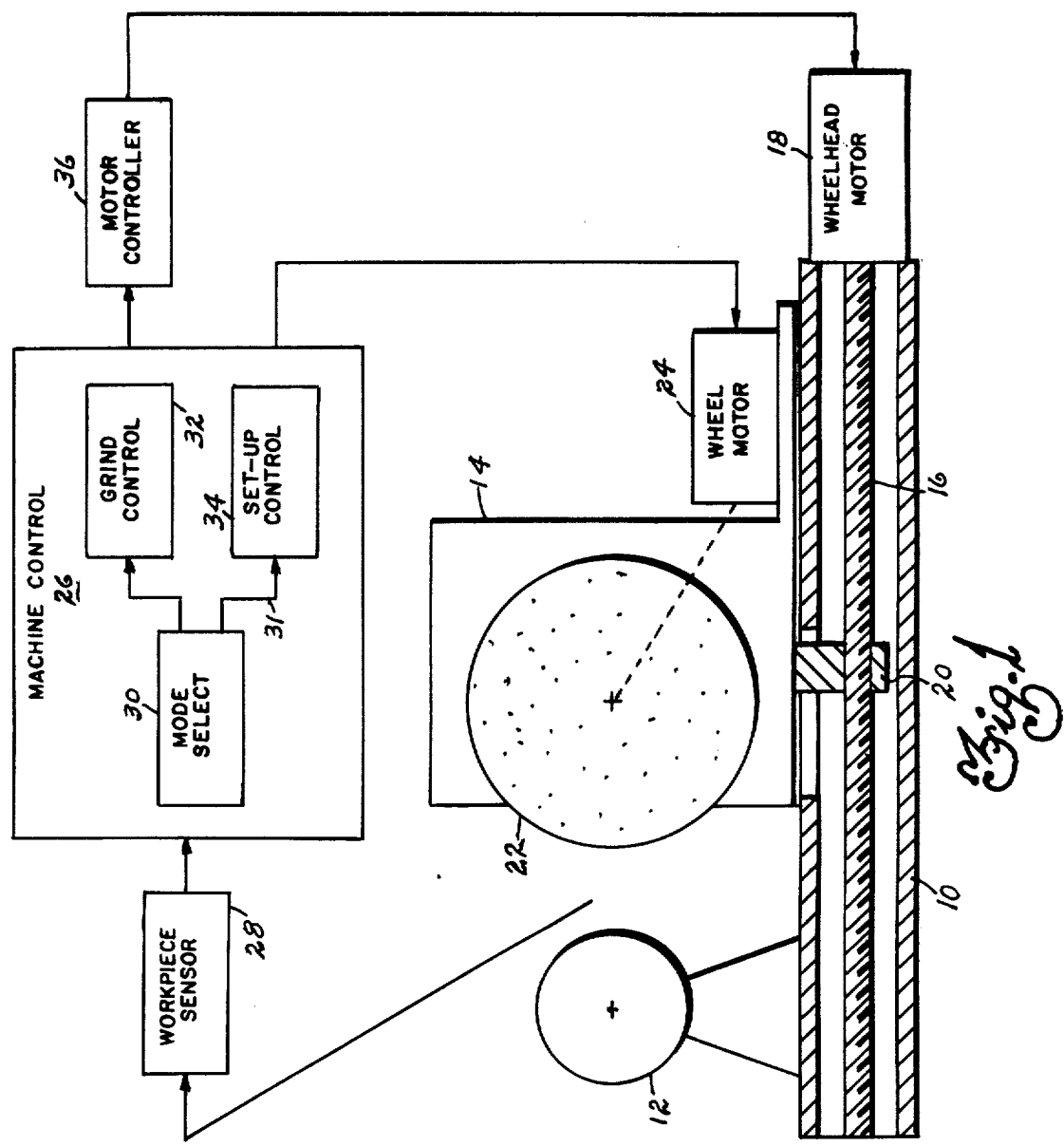
FIG. 1 illustrates the general environment of the invention.

FIG. 1 illustrates the nominal machine and control elements necessary to practice the claimed invention. While the machine is generally illustrated as a grinding machine, the claimed invention may be applied to any machine having a cutting tool for removing material from the workpiece to generate a finished part. The machine is comprised of a base 10 supporting a workpiece 12. With a grinding machine of the configuration generally shown in FIG. 1, the workpiece is typically rotated by a motor which is not illustrated; however, with other grinding machine configurations, e.g., a surface grinder, the workpiece is stationary. The claimed invention may be applied to either type of machine. A sliding member or wheelhead 14 is movably mounted on the base. A ball screw 16 is rotatably driven by a wheelhead motor 18 to impart linear motion to a ball screw nut 20 connected to the wheelhead 14. This arrangement provides relative motion between the wheelhead and the workpiece. A cutting tool or abrasive wheel 22 is rotatably mounted in the wheelhead and rotated by a wheel motor 24.

A control apparatus or machine control 26 responds to a workpiece sensor 28. The workpiece sensor detects when the cutting tool is in close proximity or in superficial contact with the workpiece. The workpiece sensor may be implemented by a contact gage, a circuit detecting electrical continuity between the cutting tool and the workpiece, a sonic sensor or a circuit detecting cutting forces upon the cutting tool in response to a superficial contact between the cutting tool and the workpiece. The machine control 26 is generally comprised of a mode select switch 30, grind control circuits 32 and set-up control circuits 34. As previously discussed, the claimed invention is limited to the set-up process required for machine operation. During the set-up process, the machine is not being used for production purposes of producing finished parts. The function of the set-up process is to establish machine conditions and parameters in order to permit the execution of a subsequent production machining operation. The invention improves the set-up process by enabling the cutting tool to be precisely positioned relative to the workpiece more quickly and accurately than is possible with traditional manual operations. To accomplish this set-up cycle of operation, the set-up control generates a number of motor control signals to the motor controller 36 which activates the wheelhead motor 18 to provide the desired relative motion between the cutting tool 22 and the workpiece 12.

Figure 2:
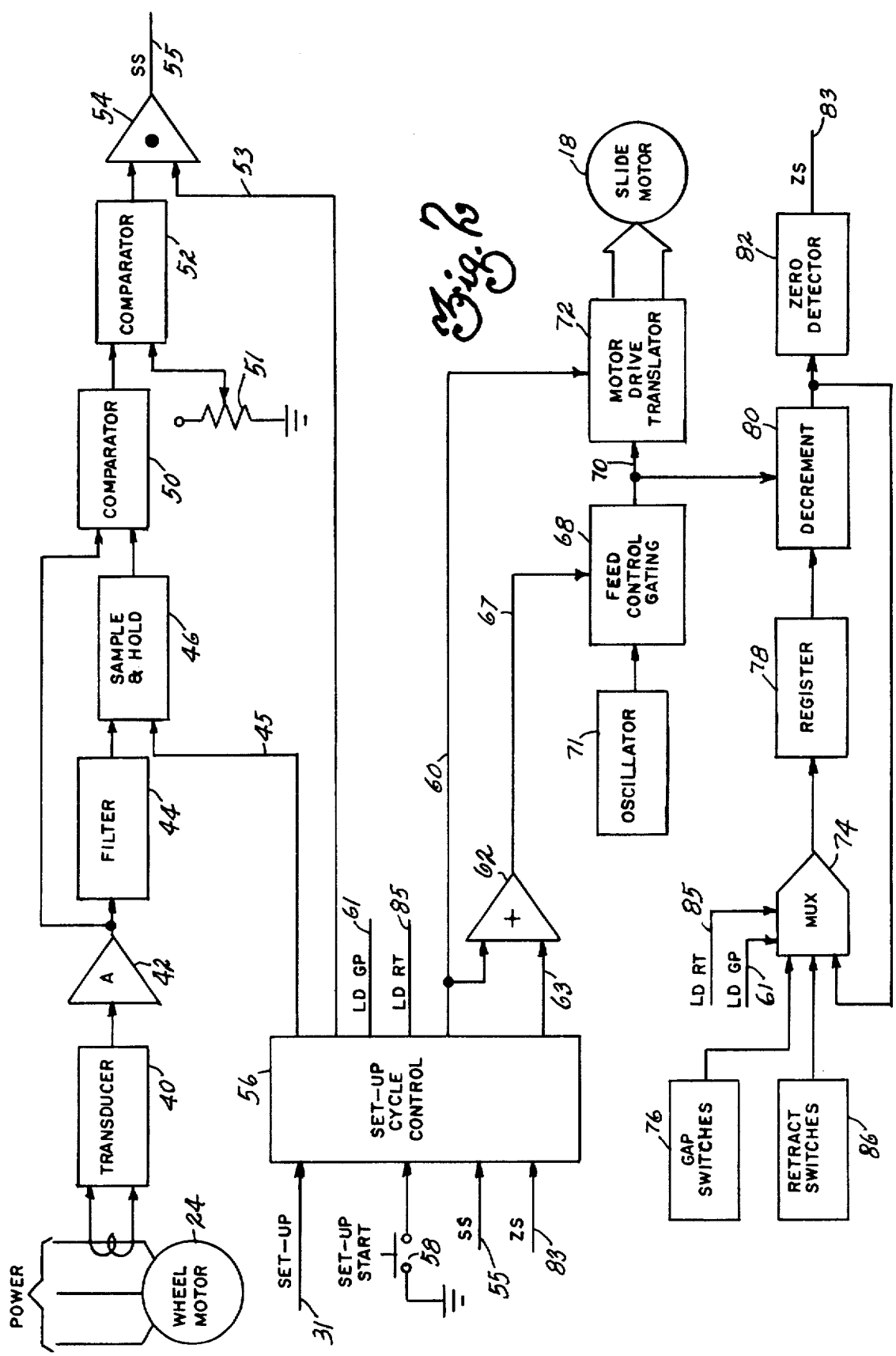
FIG. 2 is a detailed block diagram of one embodiment of the invention for establishing a predetermined positional relationship between the cutting tool and the workpiece.

FIG. 2 is a detailed block diagram of an embodiment of the invention for establishing a predetermined positional relationship between the cutting tool and the workpiece. When an operator begins a new job, the set-up process may require that he manually touch up on the workpiece in a particular location, clean up on the workpiece to remove out-of-roundness, tram the workpiece to check or remove taper, or locate the cutting tool at a predetermined incremental displacement from the workpiece. In other situations, after the set-up process has been completed, the operator may be required to shut down the machine before all of the workpieces have been machined. When power is restored, the set-up process requires that the cutting tool be moved to a position from which a machine cycle may begin. In all of these situations, the cutting tool must be brought into close proximity or into contact with the workpiece. As previously described, with current machine this is a time consuming process requiring great care, patience and skill.

The set-up cycle control permits the operator to automatically position the cutting tool and the workpiece in a predetermined positional relationship. However, prior to executing the set-up cycle, the operator must define this desired relationship; and he is provided with gap switches 76 and retract switches 86 for this purpose. The switches provide a means for selectively storing signals representing desired increment displacements between the tool and the workpiece which define the final position of the cutting tool at the end of the automatic set-up cycle of operation.

In situations where the operator desires to bring the cutting tool into contact with the workpiece and stop, the gap and retract switches 76 and 86, respectively, are set to zero. If the operator desires the final position of the cutting tool to be incrementally displaced from the workpiece, he enters a gap signal in the gap switches equal to the incremental displacement and a zero value in the retract switches. On a grinding machine, the operator may desire that the final grinding position be the point from which a production grinding cycle may begin. In this case, he sets the gap switches 76 to a value equal to the gap increment required by the grinding cycle; and the retract switches are set to represent an incremental displacement beyond the gap increment which facilitates loading and unloading of the workpiece. For purposes of this disclosure, the disclosed switches are equivalent to any typical storage device, permanent or changeable; and therefore, the disclosure encompasses traditional controls in which the retract signal is a predetermined permanently stored parameter within the control. In the following description, it will be assumed that the operator has entered a gap signal in the gap switches 76 and a retract signal in the retract switches 86.

In the preferred embodiment, the workpiece sensor is manifested by a force sensor responsive to wheelhead motor 24. A load detecting means or transducer 40 is connected to the wheelhead motor 24. Transducer 40 will be described as a current transducer for purposes of illustration, but as will be readily appreciated by those who are skilled in the art, the transducer 40 may be of any other conventional type, e.g. a power transducer or watt transducer. The transducer 40 which generates a signal proportional to the current drawn by the grinding wheel motor 24 is connected to an amplifier circuit 42 which is in turn connected to a filter circuit 44. The amplifier and filter circuits 42 and 44 amplify and buffer the transducer signal to provide a DC signal representative of the transducer signal which is applied to a sample and hold circuit 46. The sample and hold circuit 46 may be any of several commercially available units and samples the signal from the filter 44 when the wheel is idling in its fully retracted position. The sampling is accomplish in response to a triggering signal on line 45 generated in response to the switch 30 (FIG. 1) selecting the set-up mode of operation and the set-up cycle control 56 generating an electrical pulse on line 45. The sampled transducer signal which is stored for the duration of the grinding cycle is representative of the idle current required to rotate the grinding wheel under no load conditions, i.e. the non-grinding forces on the wheel motor 24.

The set-up cycle control 56 responds to a number of input signals to generate a number of output signals for controlling the execution of the set-up cycle of operation. The set-up cycle of operation is initiated by depressing the set-up start push button 58. The set-up cycle control 56 responds to this input by generating an activate sensor signal on line 53 and a forward signal on line 60. The foward signal passes through OR gate 62 to produce a drive signal on line 67 and is connected to the feed control gating circuit 68. Another input to the feed control gating circuit 68 is a feed clock signal generated by an oscillator 71. The frequency of the feed clock signal determines the velocity of the wheelhead motion. For purposes of this disclosure, it will be assumed that the wheelhead velocity during the execution of the set-up cycle of operation is constant. However, as will be appreciated by those who are skilled in the art, the frequency of the oscillator 71 may be changed to produce different feed clock frequencies for different wheelhead motions. The drive signal on line 67 causes the feed control gating circuit 68 to generate feed pulses on line 70. A motor drive translator 72 is responsive to the feed pulses and the forward signal on line 60 defining a forward direction to generate motor drive signals which cause the slide motor 18 to move the cutting tool 22 toward the workpiece 12. The motor drive translator 72 and slide motor 18 may be any commercially available motor and motor driver combination.

While the cutting tool is moving toward the workpiece, a comparator 50 receives a continuously monitored signal from the transducer 40 and compares this value to that of the signal stored by the sample and hold circuit 46. When the cutting tool makes superficial contact with the workpiece, the current drawn by the wheel motor 24 will rise suddenly and the output of the transducer 40 will increase accordingly. A difference develops between the monitored and stored signals, i.e. between load and no load conditions; and the comparator 50 generates a grinding force signal in response thereto. The grinding force signal is proportional to the difference between the load and no load signals and thus represents the forces upon the grinding wheel attributable to the superficial contact. This grinding force signal is then applied to a second comparator 52 where it is compared to a first reference signal of a predetermined magnitude from a potentiometer 51. The magnitude of this first reference level is set at a level slightly in excess of anticipated fluctuations which might occur in the no load wheel motor current in order to insure that a grinding force signal exceeding the reference is in fact attributable to superficial contact of the grinding wheel with the workpiece. An AND gate 54 is responsive to an activate sensor signal on line 53 which was produced by the set-up cycle control in response to the set-up start push button 58 being depressed. The gate 54 is also responsive to the grinding force signal from the comparator 52, and the simultaneous occurrence of both these signals produces a sense signal indicating the grinding wheel has made superficial contact with the workpiece during the set-up cycle of operation.

The set-up cycle control 56 changes the state of three of its output signals in response to receiving the sense signal on line 55. First, the forward signal on line 60 is terminated. Second, a load gap signal is produced on line 61 which is connected to the multiplexer 74. The load gap signal causes the gap signal stored in the gap switches 76 to be transferred into the register 78 through the multiplexer 74. Loading the gap signal in register 78 will terminate the zero signal 83 from the zero detector 82 thereby indicating that a reverse motion is required. Therefore, the cycle of control will terminate the load gap signal and produce a reverse signal on line 63. The reverse signal produces a drive signal on line 67 which permits the feed control gating circuit 68 to produce feed pulses on line 70. The absence of the forward signal on line 60 represents a signal state defining the reverse direction. The motor drive translator 72 responds the reverse direction command by gating the feed pulses to the motor 18 to cause the wheelhead to move away from the workpiece.

With typical control designs, temporary storage registers are preset to zero when power is applied or when changing operating modes. Therefore, during the forward motion of the cutting tool, having been previously preset to zero, the register 78 contains a zero quantity. By loading the gap signal in register 78 in response to the sense signal, subsequent cutting tool motion will occur with respect to the point of superficial contact between the cutting tool and the workpiece. Therefore, the set-up cycle of operation aligns the working edge of the cutting tool to the workpiece, and subsequent cutting tool motions in either the set-up or grinding modes will be coordinated with the detected workpiece location.

During the reverse movement of the cutting tool, the register 78 contains the gap signal representing the desired incremental displacement in the reverse direction. The register 78 operates with a decrementing circuit 80 and the multiplexer 74 to continuously recirculate its contents. The decrementing circuit 80 is responsive to each feed pulse on line 70 generated during the reverse motion of the wheelhead to decrement the gap signal contained in the register 78 by one increment of resolution, i.e. the smallest incremental displacement through which the control and slide drive can control motion of the wheelhead. This process continues until the contents of register 78 are decremented to a zero value. At this point, the zero detector 82 produces a zero signal on line 83.

The set-up cycle control 56 responds to the zero signal on line 83 by terminating the reverse signal and producing a load retract signal on line 85. The load retract signal will cause the multiplexer 74 to load the retract signal stored in the retract store 86 into the register 78. Loading the retract signal in register 78 terminates the zero signal 83 which indicates to the cycle control 56 that a retract move is required. Therefore, the cycle control 56 will terminate the retract signal and will again produce the reverse signal on line 63. As previously described, the contents of the register 78 are continuously recirculated and decremented one increment of resolution with each feed pulse while the cutting tool is moving away from the workpiece. When the contents of the register 78 are decremented to zero, the zero detector 82 produces a zero signal on line 83 a second time. The second occurrence of the zero signal is detected by the set-up cycle control 56, and the reverse signal on line 63 is terminated thereby completing the set-up cycle of operation.

The circuit of FIG. 2 provides the machine operator with great versatility in defining different set-up cycles of operation. For example, the operator may desire to bring the cutting tool into superficial contact with the workpiece and stop its motion with no retraction. This can be readily accomplished by setting the gap and retract signals equal to zero. The circuit will operate as previously described; and in response to a sense signal, the zero value gap signal will be loaded into the register 78. The recirculating operation of the register 78 occurs at a rate much faster than the frequency of the feed pulses and a zero signal will be immediately produced on line 83; and the set-up cycle control will produce a load retract signal but no reverse signal. The load retract signal will cause the zero retract signal to be loaded in register 78; and as before, a zero signal will be immediately produced on line 83 thereby causing the set-up cycle control to terminate the set-up cycle of operation without generating a reverse signal. In a second embodiment, the operator may require that after superficially contacting the workpiece, the cutting tool retract by a small predetermined magnitude. To achieve this, the operator uses the gap switches 76 to select a gap signal equal to the desired magnitude. The set-up cycle of operation will proceed as previously described; and after contacting the workpiece, the cutting tool will move in the reverse direction through a displacement defined by the gap signal. The occurrence of the zero signal on line 83 will cause the set-up cycle control to generate a load retract signal which causes the zero value retract signal to be loaded into the register 78. Again, the zero retract signal will be detected by the zero detector 82, and the second occurrence of the zero signal on line 83 will cause the set-up cycle control to terminate the set-up cycle of operation without producing a reverse signal for the retract operation.

Figure 3:
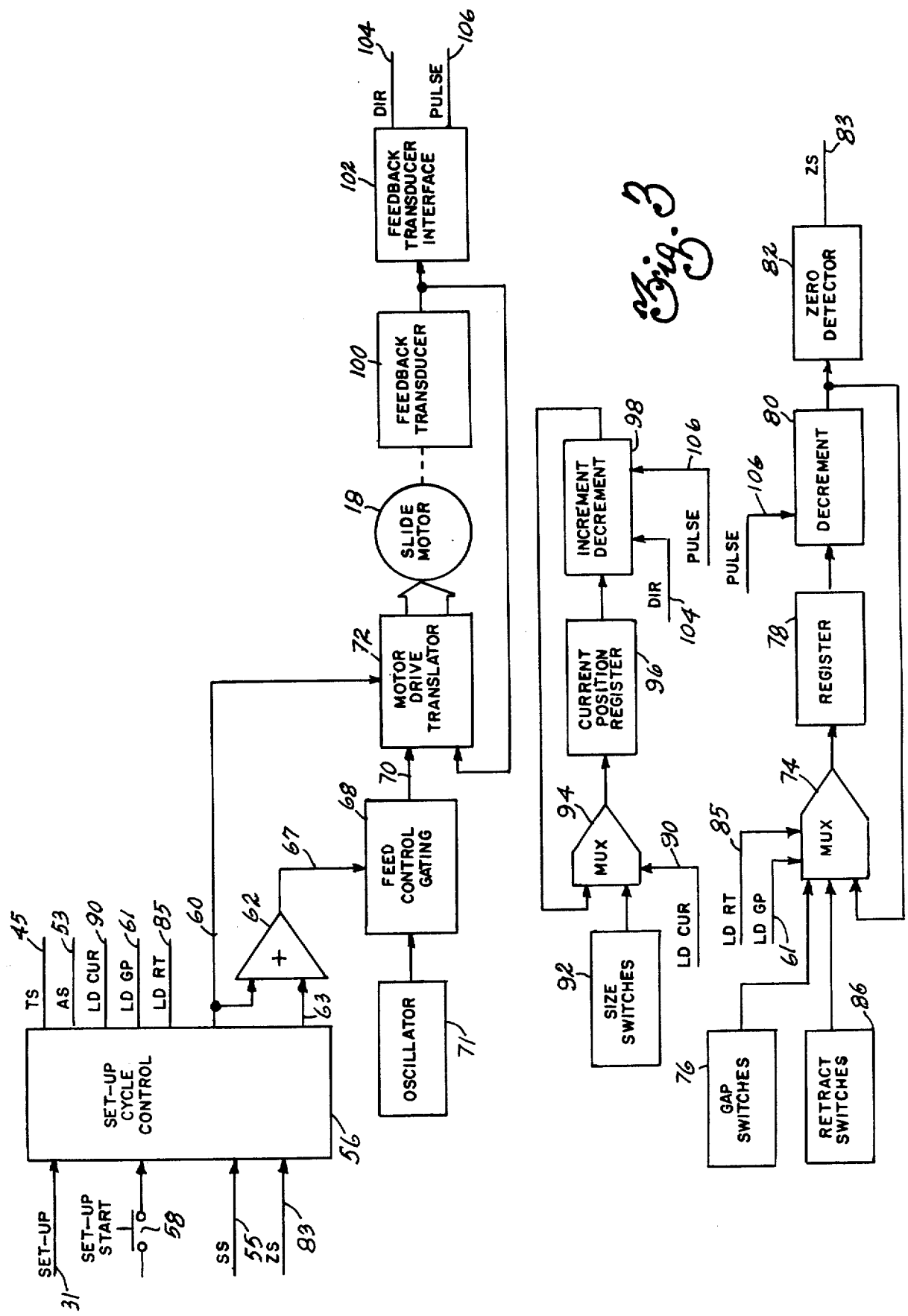
FIG. 3 is a detailed block diagram of another embodiment of the invention for establishing and continuously tracking the absolute position of the working edge of the cutting tool.

FIG. 3 is a detailed block diagram illustrating an alternative embodiment of the invention in which the set-up cycle of operation may be used to establish an absolute reference for the working edge of the grinding wheel from which subsequent grinding wheel motions may be measured. Most grinding controls are incremental devices; that is to say, after the grinding wheel has been aligned with the workpiece, all subsequent motions are programmed, commanded and measured in terms of incremental displacements. Therefore, the position of the grinding wheel is never identified with respect to a fixed reference, e.g. the center line of the workpiece. The embodiment in FIG. 3 permits the operator to select prior to executing a set-up cycle of operation, an absolute reference from which grinding wheel positions will be measured and identified. The most logical reference is the center line of the workpiece; and typically, the radius or diameter of a cylindrical workpiece or side length of a prismatic workpiece provide the most meaningful information. Therefore the operator is provided with size switches 92 in which he enters a size signal representing a measured characteristic of the workpiece. If the operator desires a continuous, absolute measurement of the workpiece diameter, he measures the diameter of the workpiece which may be a master or standard and enters that diameter in the size switches 92. The embodiment of FIG. 3 will establish an initial diametric reference with respect to the measured diameter; and thereafter, all subsequent grinding wheel motion will be measured relative to units of diameter.

It should be understood that the force sensing elements for producing the sense signal which have been described relative to FIG. 2 are also required for the operation of the circuit in FIG. 3 even though they are not illustrated. Further, FIG. 3 contains many elements which are identical to the elements described with respect to FIG. 2, and the operation of these elements is consistent with the previous description. Therefore, a set-up cycle of operation is initiated by selecting the set-up mode and depressing the set-up start push button 58 which causes the grinding wheel to move at a predetermined feed rate toward the workpiece.

Upon generating a sense signal in response to superficial contact between the grinding wheel and the workpiece, the set-up cycle control of FIG. 3 executes the following operations. First, the forward signal on line 60 is terminated. Next, a load gap signal and a load position signal are generated on lines 61 and 90, respectively. The load position signal causes the multiplexer 94 to transfer the size signal from the size switches 92 to a current position register 96. The current position register 96 operates similarly to the register 78 in that it continuously recirculates the contents of the register through the increment/decrement circuit 98 and the multiplexer 94. Therefore, upon the grinding wheel contact the workpiece, the gap signal is loaded into the register 78; and the size signal is loaded into the current position register which then contains a position signal representing the absolute position of the working edge of the grinding wheel relative to the center line of the workpiece. After registers 78 and 96 have been loaded, the zero signal on line 83 is terminated; and the cycle control terminates the load gap and load position signals and produces a reverse signal on line 63. Assuming a non-zero magnitude for the gap signal, the drive and reverse direction signals on lines 67 and 60, respectively, will cause feed pulses to be delivered to the motor drive translator 72 which in turn will activate the motor to move the wheelhead away from the workpiece.

The embodiment of FIG. 3 contains a feedback circuit comprised of a feedback transducer 100 and a feedback transducer interface 102. The feedback transducer 100 produces a feedback signal to the motor drive translator 72 representing the direction and magnitude of the actual motion of the motor 18 in response to the feed pulses on line 70. The feedback transducer interface is also responsive to the feedback signal to produce a direction signal on line 104 and a feedback pulse on line 106. The feedback circuit of FIG. 3 allows the contents of registers 78 and 96 to be modified in accordance with the actual motion of the wheelhead as opposed to the commanded motion as described in FIG. 2.

Therefore, during the execution of the gap move, the decrementing circuit 80 decrements the gap signal by one increment of resolution with each occurrence of the feedback pulse. Similarly, the increment/decrement circuit 98 will modify the magnitude of the position signal by one increment of resolution for each feedback pulse as a function of the state of the direction signal on line 104. If the direction signal indicates the grinding wheel is moving away from the workpiece, the magnitude of the position signal will be increased; and if the state of the ditrection signal corresponds to a motion of the grinding wheel toward the workpiece, the magnitude of the position signal will be decremented by one increment. Consequently, as the grinding wheel moves relative to the workpiece, the position signal is updated to continuously represent the absolute position of the working edge of the grinding wheel relative to the units of measurement defined by the size signal. More specifically, if the size switches contain a diameter measurement, the magnitude of the position signal will be a continuous indication of the diameter of the workpiece. Similarly, if the size signal in the switches 92 represents the radius of the workpiece, the position signal in the current position register will provide a continuous absolute indication of radius or true distance from the workpiece center line. The operation of the circuit in FIG. 3 continues in a manner identical to that described with respect to FIG. 2 until the set-up cycle of operation is complete.

Although it is not disclosed, those who are skilled in the art will recognize that with the embodiment of FIG. 3, a visual display of the absolute position of the grinding wheel may be readily provided. By connecting the display to the current position register 96, the display will readout the appropriate units of absolute cutting tool position, e.g. radius, diameter or side length.

It will also be appreciated by those who are skilled in the art that the control elements disclosed in FIGS. 2 and 3 must be compatible with a particular overall machine control architecture; and further, the control elements of FIGS. 2 and 3 may be implemented using any of the commercially available technologies applicable to machine control systems.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What we claim is:

1. A control apparatus connected to a machine having a base supporting a workpiece, a cutting tool, a machine slide and a slide drive connected to the control apparatus for producing relative motion between the cutting tool and the workpiece, said control apparatus executing a set-up cycle of operation to establish a predetermined positional relationship between the cutting tool and the workpiece prior to executing a machining cycle of operation, the control apparatus comprising:
   (a) means for selectively storing a final position signal representing a final position of the cutting tool relative to the workpiece;
   (b) means for initiating a set-up cycle of operation;
   (c) means responsive to the initiating means for producing a forward signal to cause the cutting tool and the workpiece to move into superficial contact;
   (d) means for generating a sense signal in response to the superficial contact between the cutting tool and the workpiece;
   (e) means responsive to the generating means for producing a reverse signal to cause the cutting tool and the workpiece to move apart in response to the sense signal; and
   (f) means responsive to the storing means for stopping motion of the cutting tool at the final position in response to the final position signal thereby establishing the predetermined positional relationship between the cutting tool and the workpiece.

2. A control apparatus connected to a grinding machine of the type having a base supporting a workpiece, a wheelhead carrying an abrasive wheel, a wheel motor for rotating the abrasive wheel, and a wheelhead drive connected to the control apparatus for producing relative motion between the wheelhead and the workpiece, said control apparatus executing a set-up cycle of operation to establish a predetermined positional relationship between the abrasive wheel and the workpiece prior to executing a machine cycle of operation, the control apparatus comprising:
   (a) means for selectively storing a gap signal representing an incremental displacement between the abrasive wheel and the workpiece;
   (b) selecting means for establishing a set-up mode of operation;
   (c) means responsive to the selecting means for initiating a set-up cycle of operation;
   (d) means responsive to the initiating means for producing a forward signal to move the abrasive wheel into superficial contact with the workpiece thereby causing a grinding force between the abrasive wheel and the workpiece;
   (e) means connected to the wheel motor for generating a sense signal in response to the grinding force;
   (f) means responsive to the sense signal for producing a reverse signal to move the abrasive wheel away from the workpiece; and
   (g) means responsive to the storing means for terminating motion of the abrasive wheel in response to the abrasive wheel and the workpiece achieving the predetermined positional relationship defined by the gap signal.

3. A control apparatus connected to a grinding machine of the type having a base supporting a workpiece, a wheelhead carrying an abrasive wheel, a wheel motor for rotating the abrasive wheel, and a wheelhead drive connected to the control apparatus for producing relative motion between the wheelhead and the workpiece, said control apparatus executing a set-up cycle of operation to establish a predetermined positional relationship between the abrasive wheel and the workpiece prior to executing a machine cycle of operation, the control apparatus comprising:
   (a) first means for selectively storing a gap signal representing an incremental displacement between the abrasive wheel and the workpiece;
   (b) second means for storing a retract signal representing an incremental displacement of the abrasive wheel beyond the incremental displacement defined by the gap signal;
   (c) selecting means for establishing a set-up mode of operation;
   (d) means responsive to the selecting means for initiating a set-up cycle of operation;
   (e) means responsive to the initiating means for producing a forward signal to move the abrasive wheel into superficial contact with the workpiece thereby causing a grinding force between the abrasive wheel and the workpiece;
   (f) means connected to the wheel motor for generating a sense signal in response to the grinding force;
   (g) means responsive to the sense signal for producing a reverse signal to move the abrasive wheel away from the workpiece; and
   (h) means responsive to the first and second storing means for terminating motion of the abrasive wheel in response to the abrasive wheel and the workpiece achieving the predetermined positional relationship defined by the gap and retract signals.

4. A control apparatus connected to a grinding machine of the type having a base supportingg a workpiece, a wheelhead carrying an abrasive wheel, a wheel motor for rotating the abrasive wheel, and a wheelhead drive responsive to the control apparatus for producing relative motion between the wheelhead and the workpiece, said control apparatus executing a set-up cycle of operation to establish a predetermined positional relationship between the abrasive wheel and the workpiece prior to executing a machining cycle of operation, the control apparatus comprising:
   (a) first means for selectively storing a gap signal representing an incremental displacement between the abrasive wheel and the workpiece;
   (b) second means for selectively storing a size signal representing a measured dimension of the workpiece;
   (c) selecting means for establishing a set-up mode of operation;
   (d) means responsive to the selecting means for initiating a set-up cycle of operation;
   (e) means responsive to the initiating means for producing a forward signal to move the abrasive wheel into superficial contact with the workpiece thereby causing a grinding force between the abrasive wheel and the workpiece;
   (f) means connected to the wheel motor for generating a sense signal in response to the grinding force;

(g) third means for storing a position signal representing the current position of the abrasive wheel relative to the workpiece;

(h) means responsive to the generating means and the second storing means for setting the position signal equal to the size signal in response to the occurrence of the sense signal;

(i) means responsive to the sense signal for producing a reverse signal to move the abrasive wheel away from the workpiece;

(j) means connected to the third storing means and responsive to the motion of the abrasive wheel subsequent to the occurrence of the sense signal for modifying the position signal to continuously represent the current position of the abrasive wheel relative to the workpiece; and (k) means responsive to the first storing means for terminating motion of the abrasive wheel in response to the workpiece achieving the predetermined positional relationship defined by the gap signal.

5. A control apparatus connected to a grinding machine of the type having a base supporting a workpiece, a wheelhead carrying an abrasive wheel, a wheel motor for rotating the abrasive wheel, and a wheelhead drive connected to the control apparatus for producing relative motion between the wheelhead and the workpiece, said control apparatus executing a set-up cycle of operation to establish a predetermined positional relationship between the abrasive wheel and the workpiece prior to executing a machining cycle of operation, the control apparatus comprising:

(a) first means for selectively storing a gap signal representing an incremental displacement between the abrasive wheel and the workpiece;

(b) second means for storing a retract signal representing an incremental displacement of the abrasive wheel beyond the incremental displacement defined by the gap signal;

(c) third means for selectively storing a size signal representing a measured dimensioned of the workpiece;

(d) selecting means for establishing a set-up mode of operation;

(e) means responsive to the selecting means for initiating a set-up cycle of operation;

(f) means responsive to the initiating means for producing a forward signal to move the abrasive wheel into superficial contact with the workpiece thereby causing a grinding force between an abrasive wheel and the workpiece;

(g) means connected to the wheel motor for generating a sense signal in response to the grinding force;

(h) fourth means for storing a position signal representing the current position of the abrasive wheel relative to the workpiece;

(i) means responsive to the third storing means and the generating means for setting the position signal equal to the size signal in response to the occurrence of the sense signal;

(j) means responsive to the sense signal for producing a reverse signal to move the abrasive wheel away from the workpiece;

(k) means connected to the fourth storing means and responsive to the motion of the abrasive wheel subsequent to the occurrence of the sense signal for modifying the position signal to continuously represent the current position of the abrasive wheel relative to the workpiece; and (l) means responsive to the first and second storing means for terminating motion of the abrasive wheel in response to the workpiece achieving the predetermined positional relationship defined by the sum of the gap and retract signals.

6. A method for controlling the operation of a machine having a base supporting a workpiece, a cutting tool, a sliding member and means responsive to a control for producing relative motion between the cutting tool and the workpiece to execute a set-up cycle of operation and establish a predetermined positional relationship between the cutting tool and the workpiece prior to executing a machining cycle of operation, the method comprising the steps of:

(a) producing a gap signal representing a predetermined incremental displacement between the cutting tool and the workpiece;

(b) initiating a set-up cycle of operation;

(c) moving the cutting tool and the workpiece into superficial contact;

(d) detecting the superficial contact between the cutting tool and the workpiece;

(e) moving the cutting tool and the workpiece apart in response to detecting the superficial contact; and (f) terminating the motion separating the cutting tool and the workpiece in response to the cutting tool and the workpiece achieving the predetermined positional relationship defined by the gap signal.

7. The method of claim 6 wherein the method further comprises the steps of:

(a) setting a retract signal representing an incremental displacement of the cutting tool beyond the incremental displacement defined by the gap signal; and (b) inhibiting the step of terminating the motion separating the cutting tool and the workpiece until the cutting tool and the workpiece achieve a predetermined positional relationship defined by the sum of the gap and retract signals.

8. The method of claim 6 wherein the control includes a current position register for storing a position signal representing the current position of the cutting tool relative to the workpiece, and the method further comprises the steps of:

(a) producing a size signal representing a measured dimension of the workpiece;

(b) loading the size signal into the current position register in response to the step of detecting the superficial contact between the cutting tool and the workpiece; and (c) updating the contents of the current position register in response to motion of the cutting tool subsequent to the occurrence of superficial contact between the cutting tool and the workpiece thereby causing the position signal in the current position register to continuously represent the current position of the cutting tool relative to the workpiece.

9. A control apparatus connected to a grinding machine of the type having a base supporting a workpiece, a wheelhead carrying an abrasive wheel, a wheel motor for rotating the abrasive wheel and a wheelhead drive connected to the control apparatus for producing relative motion between the wheelhead and the workpiece, said control apparatus executing a set-up cycle of operation to establish a predetermined positional relationship between the abrasive wheel and the workpiece prior to executing a machining cycle of operation, the control apparatus comprising:
- (a) means for detecting superficial contact between the cutting tool and the workpiece and producing a sense signal in response to said contact;
- (b) first means for selectively storing a gap signal representing an incremental displacement between the abrasive wheel and the workpiece;
- (c) selecting means for establishing a set-up mode of operation;
- (d) means responsive to the selecting means for initiating a set-up cycle of operation;
- (e) a set-up cycle control responsive to the detecting means, the first storing means, and the initiating means for executing a control process defining the set-up cycle of operation and comprising the steps of:
  - (1) producing a forward signal to move the abrasive wheel toward the workpiece in response to the initiation of the set-up cycle of operation,
  - (2) producing a reverse signal to move the abrasive wheel away from the workpiece in response to the sense signal, and
  - (3) terminating motion of the abrasive wheel away from the workpiece in response to the abrasive wheel and the workpiece achieving the predetermined positional relationship defined by the gap signal.

10. The apparatus of claim 9 wherein the control apparatus further comprises:
- (a) second storing means for storing a retract signal representing an incremental displacement beyond the incremental displacement defined by the gap signal; and
- (b) the set-up cycle control executes in response to the second storing means the further step of inhibiting the step of terminating motion of the abrasive wheel away from the workpiece until the abrasive wheel and the workpiece achieve the predetermined positional relationship defined by the sum of the gap and retract signals.

11. The apparatus of claim 10 wherein the control apparatus further comprises:
- (a) third means for storing a size signal representing a measured dimension of the workpiece; and
- (b) the set-up cycle control includes a current position register for storing a position signal representing the current position of the cutting tool relative to the workpiece, said set-up cycle control executing in response to the thord storing means the further process steps of
  - (1) loading the size signal into the current position register in response to the sense signal and prior to the step of producing the reverse signal, and
  - (2) updating the position signal in the current position register in response to the motion of the cutting tool produced by the reverse signal thereby causing the position signal in the current position register to continuously represent the current position of the abrasive wheel relative to the workpiece.

* * * * *